United States Patent
Eto et al.

(10) Patent No.: US 9,428,112 B2
(45) Date of Patent: Aug. 30, 2016

(54) VEHICLE DOOR MIRROR

(71) Applicant: KABUSHIKI KAISHA HONDA LOCK, Miyazaki (JP)

(72) Inventors: Yasuyuki Eto, Miyazaki (JP); Tetsuya Oda, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 14/671,108

(22) Filed: Mar. 27, 2015

(65) Prior Publication Data
US 2015/0274076 A1   Oct. 1, 2015

(30) Foreign Application Priority Data

Mar. 31, 2014 (JP) ................. 2014-072395

(51) Int. Cl.
*G02B 7/182* (2006.01)
*B60R 1/00* (2006.01)
*F16M 13/02* (2006.01)
*B60R 1/07* (2006.01)

(52) U.S. Cl.
CPC .................. *B60R 1/006* (2013.01); *B60R 1/07* (2013.01); *F16M 13/022* (2013.01)

(58) Field of Classification Search
CPC ......... B60R 1/06; B60R 1/072; B60R 1/006; B60J 5/0404; F16M 13/022

USPC ........ 248/466, 476, 479; 359/838, 841, 871, 359/872

See application file for complete search history.

(56) References Cited

U.S. PATENT DOCUMENTS

| | | | |
|---|---|---|---|
| 7,278,767 B2 * | 10/2007 | Takahashi | B60R 1/1207 362/494 |
| 2011/0051272 A1 * | 3/2011 | Murata | B60J 5/0404 359/872 |
| 2014/0320277 A1 * | 10/2014 | Foote | B60Q 1/2665 340/435 |

FOREIGN PATENT DOCUMENTS

JP       2588975 Y2     1/1999

* cited by examiner

*Primary Examiner* — Todd M Epps
(74) *Attorney, Agent, or Firm* — Carrier Blackman & Associates, P.C.; William D. Blackman; Jingli Wang

(57) ABSTRACT

In a vehicle door mirror, a mirror housing accommodating electric components is rotatably supported at a base member that is mounted to a side door, and a coupler that is electrically connected to the electric components is attached to the base member. A sheet member that is positioned to and held by the base member and is sandwiched between the side door and the base member is fastened to the side door by being fastened together with the base member, and the coupler is clamped between the base member and the sheet member. Accordingly, the coupler can be attached using a fewer number of components and a fewer number of working steps.

9 Claims, 8 Drawing Sheets

VEHICLE DOOR MIRROR

CROSS REFERENCE TO RELATED APPLICATIONS

The present application claims priority under 35 U.S.C. §119 to Japanese Patent Application No. 2014-72395 filed Mar. 31, 2014 the entire contents of which are hereby incorporated by reference.

BACKGROUND OF THE INVENTION

1. Field of the Invention

The present invention relates to a vehicle door mirror in which a mirror housing accommodating electric components is rotatably supported at a base member that is mounted to a side door, and a coupler that is electrically connected to the electric components is attached to the base member.

2. Description of the Related Art

Japanese Utility Model Registration No. 2588975 has made known a vehicle door mirror in which a coupler connected to electric components in a mirror housing is fixed to a base member.

However, in the vehicle door mirror disclosed in Japanese Utility Model Registration No. 2588975, the coupler is fastened to the base member by means of screw members, which increases the number of working steps as well as the number of components.

SUMMARY OF THE INVENTION

The present invention has been made in the light of the above circumstances, and has an object to provide a vehicle door mirror in which a coupler can be attached using a fewer number of components and a fewer number of working steps.

In order to achieve the object, according to a first feature of the present invention, there is provided a vehicle door mirror in which a mirror housing accommodating electric components is rotatably supported at a base member that is mounted to a side door, and a coupler that is electrically connected to the electric components is attached to the base member, wherein a sheet member that is positioned to and held by the base member and is sandwiched between the side door and the base member is fastened to the side door by being fastened together with the base member, and the coupler is clamped between the base member and the sheet member.

According to the first feature of the present invention, the coupler is clamped between the base member and the sheet member which is positioned to and held by the base member. Therefore, exclusive members such as screw members and the like for attaching the coupler are not required, and fastening work of screw members is also not required. Accordingly, the coupler can be attached using a fewer number of components and a fewer number of working steps.

According to a second feature of the present invention, in addition to the first feature, a holding hole that holds a part of the coupler with the part inserted into the holding hole is provided in the sheet member, and a plurality of fitting protrusion portions that are fitted in the base member are integrally and protrusively provided on the sheet member so as to be disposed in a periphery of the holding hole.

Further, according to the second feature of the present invention, the plurality of fitting protrusion portions which are fitted in the base member are disposed in the periphery of the holding hole which is provided in the sheet member so as to hold the part of the coupler with the part inserted into the holding hole, and therefore, the coupler can be firmly held between the sheet member and the base member.

The above and other objects, characteristics and advantages of the present invention will be clear from detailed descriptions of the preferred embodiment which will be provided below while referring to the attached drawings.

DESCRIPTION OF THE PREFERRED EMBODIMENT

Figure 1:
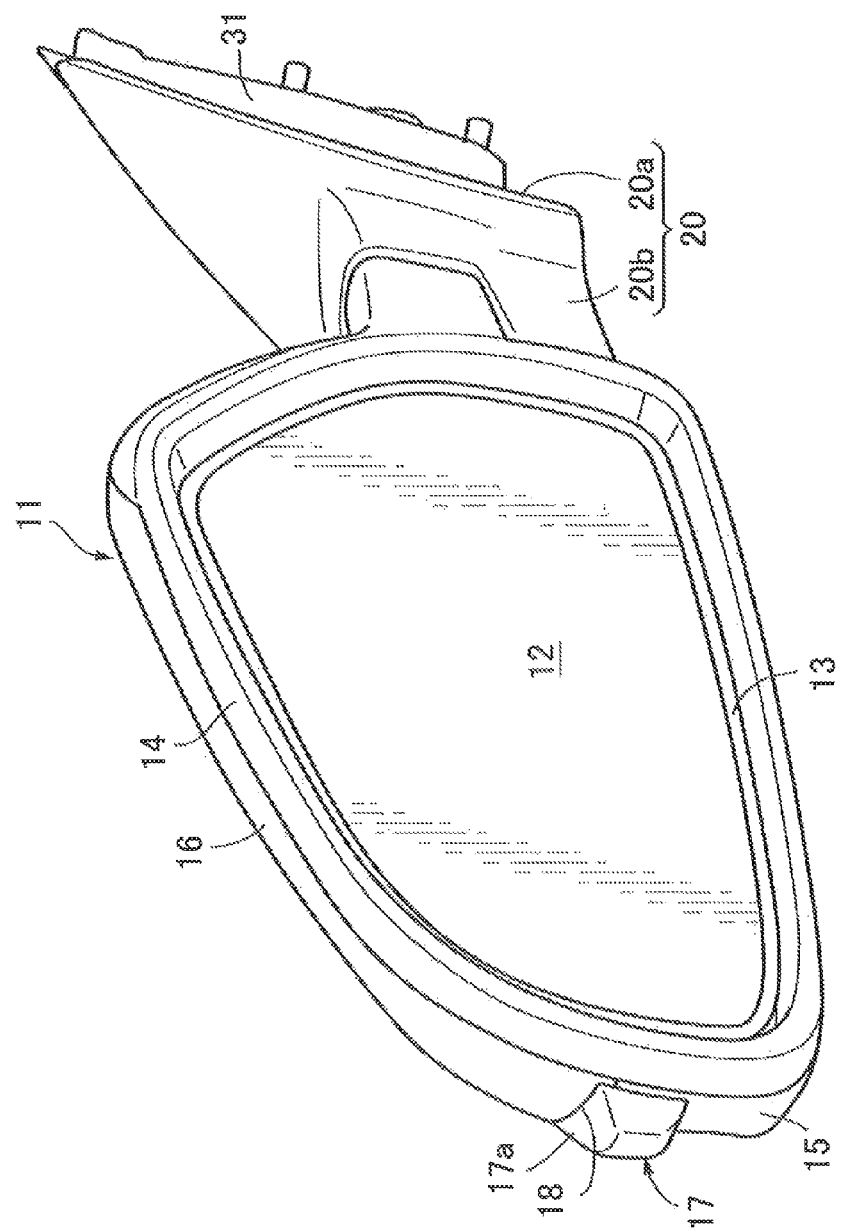
FIG. 1 is a perspective view of a vehicle door mirror.
Figure 2:
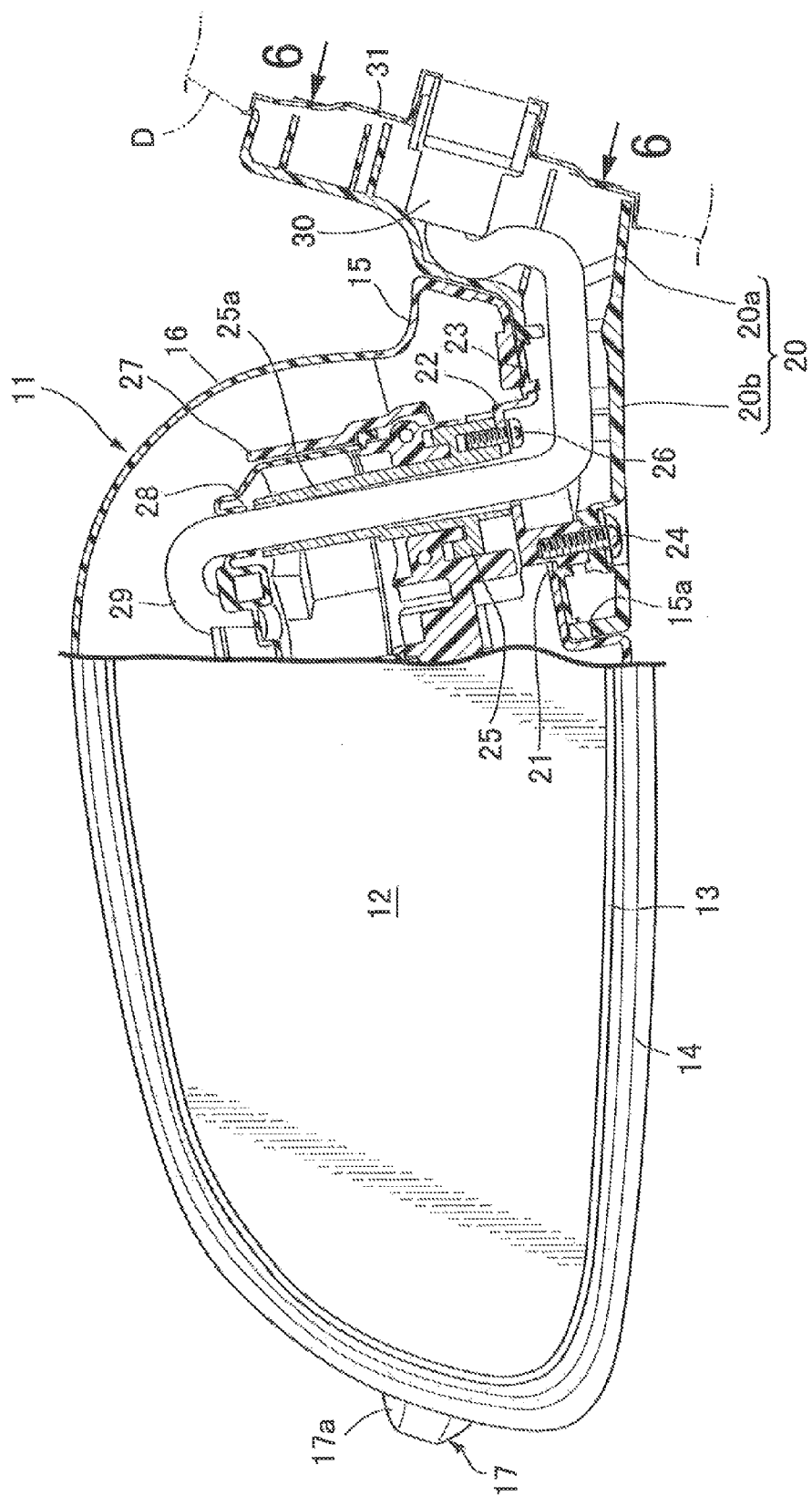
FIG. 2 is a partially cutaway longitudinal sectional side view of the vehicle door mirror.

An embodiment of the present invention will now be described with reference to accompanying FIGS. 1 to 8. In FIGS. 1 and 2, a mirror housing 11 of a door mirror includes a housing main body 14 of a synthetic resin having a mirror accommodation concave section 13 in which a mirror 12 is accommodated, a lower cover 15 of a synthetic resin that covers a lower portion of the housing main body 14 from below, and an upper cover 16 of a synthetic resin that covers the housing main body 14 from a direction opposite from the mirror 12.

A light emitting section 17a of a side turn lamp 17 is mounted to the housing main body 14, and a window 18 through which a part of the side turn lamp 17 appears is formed between the lower cover 15 and the upper cover 16.

To a vehicle side door D, a base member 20 having a support arm section 20b that protrudes to an outer side from the side door D is mounted, and a concave section 15a that accommodates the support arm section 20b is formed at a lower portion, on the side door D side, of the lower cover 15 in the mirror housing 11.

Figure 3:
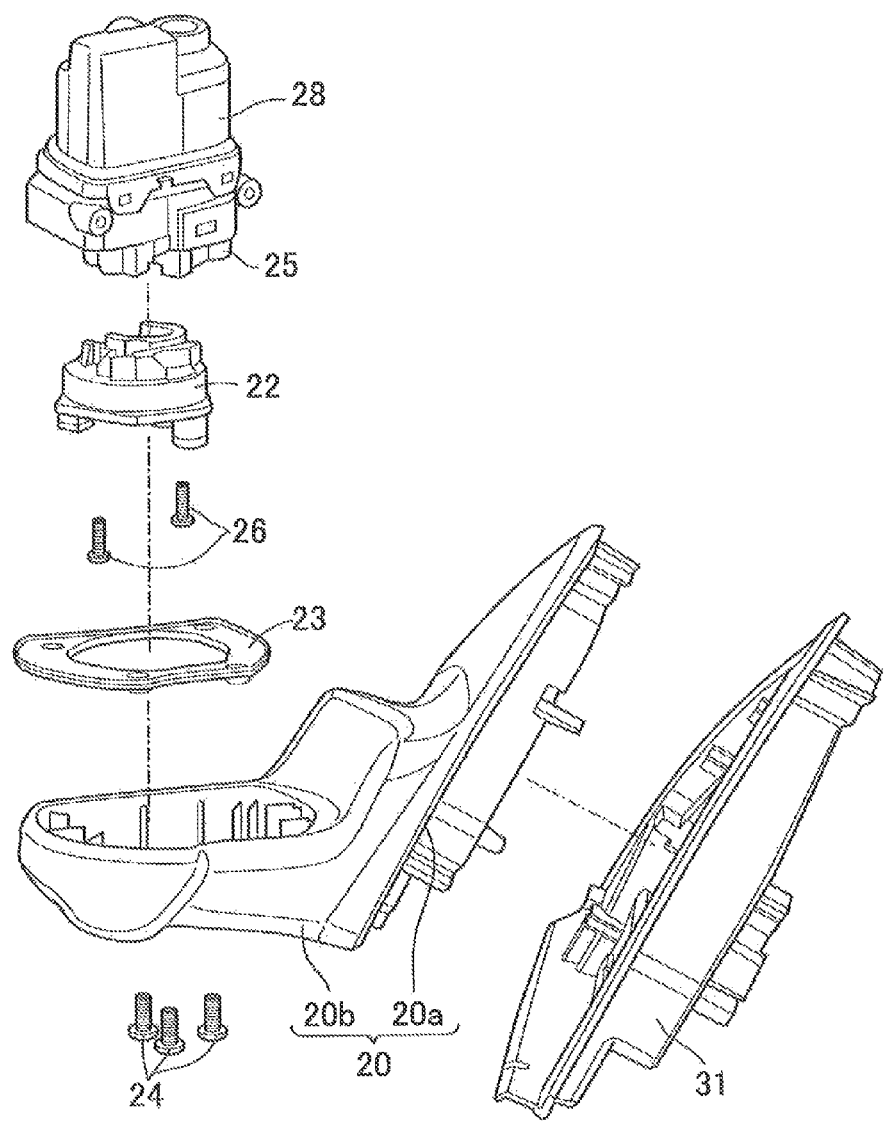
FIG. 3 is an exploded perspective view of an essential part of the vehicle door mirror.

Also referring to FIG. 3, a shaft support base 22, a part of which is protruded into the mirror housing 11 from an opening 21 provided at the lower cover 15 so as to open to the concave section 15a, is mounted on to the support arm section 20b with, for example, three screw members 24 so as to sandwich a seal member 23 between the shaft support base 22 and the support arm section 20b. Further, to the shaft support base 22, a support member 25 having a cylindrical shaft section 25a which extends up and down is mounted with, for example, two screw members 26.

Meanwhile, a bracket 27 is fixed to the housing main body 14 of the mirror housing 11, and to the bracket 27, an electric storage unit 28 that is rotatably supported by the shaft section 25a is mounted. The mirror housing 11 is supported by the support arm section 20b of the base member 20 to be rotatable around an axis of the shaft section 25a between a standing position at which the mirror housing 11 protrudes sideward from the side door D, and a storing position at which the mirror housing 11 is stored on the side door D side by operation of the electric storage unit 28.

Further, to the bracket 27, an electric actuator (not illustrated) that is disposed behind the mirror 12 is mounted so as to enable the mirror 12 to swing up and down and laterally.

A harness 29 that is electrically connected to the electric components accommodated in the mirror housing 11, such as the side turn lamp 17, the electric storage unit 28, the electric actuator and the like in this embodiment, penetrates through the shaft section 25a from an inside of the mirror housing 11 to be led out to the base member 20 side, and is connected to a coupler 30 that is coupled to the base member 20 side.

Figure 4:
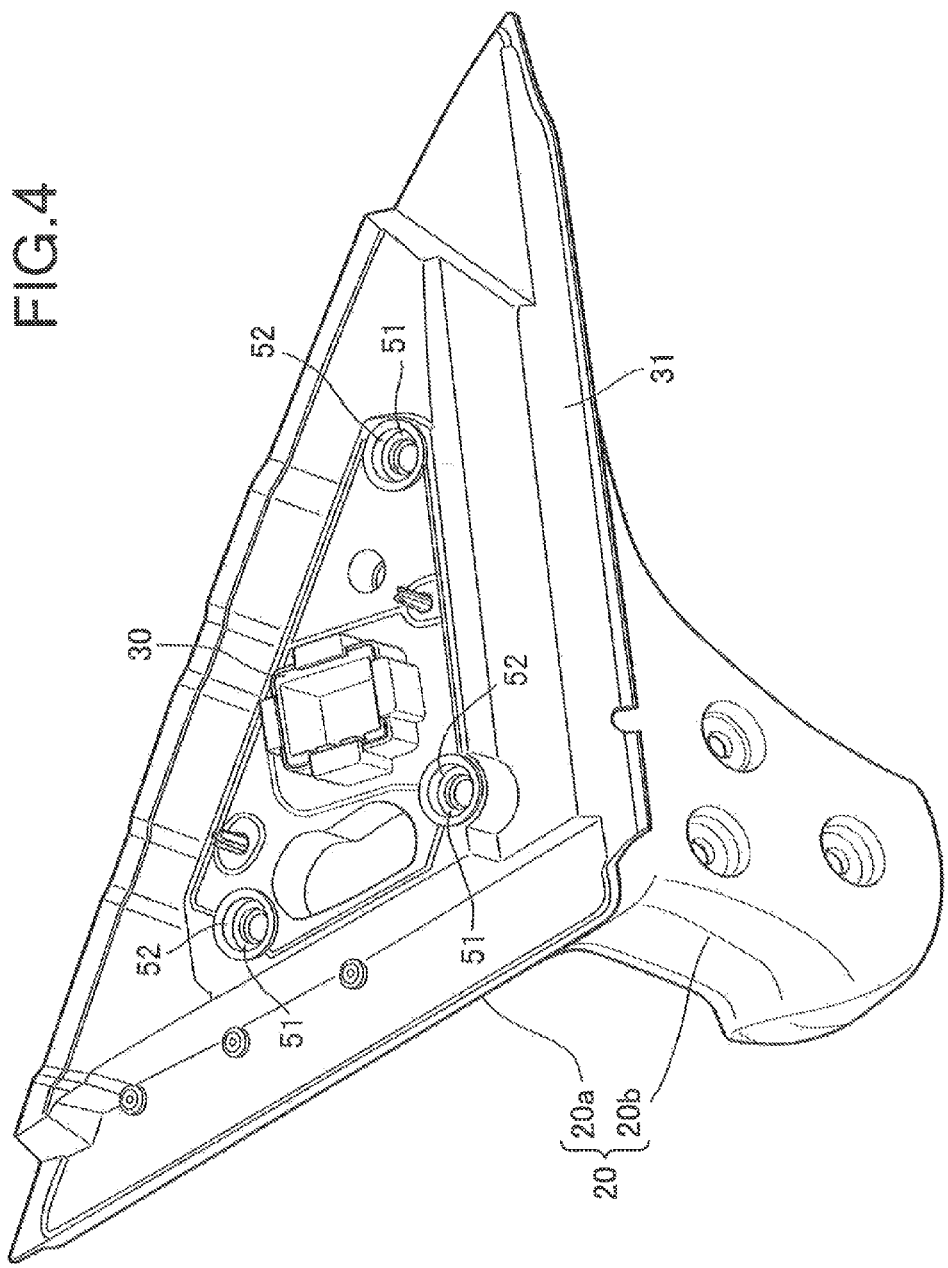
FIG. 4 is a perspective view of a base member and a sheet member.
Figure 5:
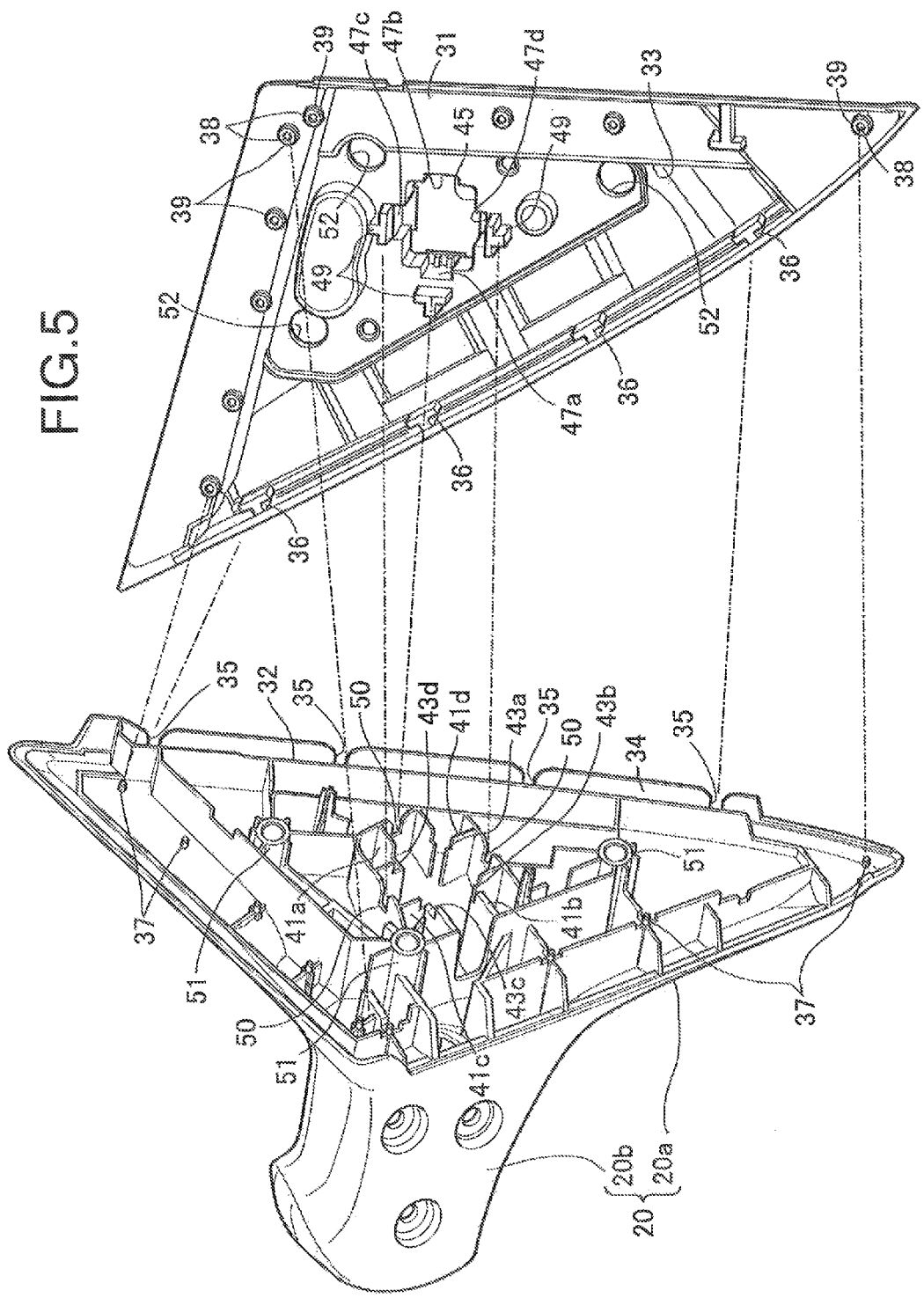
FIG. 5 is an exploded perspective view of the base member and the sheet member.

Also referring to FIGS. 4 and 5, the base member 20 is formed of a synthetic resin to integrally have a base section 20a that is formed into a triangular shape so as to be mounted to the side door D, and the support arm section 20b which is integrally provided connectively to the base section 20a so as to protrude to the outer side of the side door D. The base section 20a of the base member 20 is fastened to the side door D by being fastened together with a sheet member 31 that is positioned to and held by the base section 20a, and is sandwiched between the side door D and the base section 20a, and the sheet member 31 is also formed into a triangular shape corresponding to the shape of the base section 20a.

On a surface of the base section 20a facing to the sheet member 31 side, a rib 32 that protrudes to the sheet member 31 side in a portion near to an outer periphery of the surface is integrally provided to protrude so as to be in a substantially triangular shape as a whole, and an accommodation concave section 33 that accommodates the rib 32 is formed on the sheet member 31.

Further, at the outer periphery of a portion corresponding to one side of the triangular shape in the outer periphery of the base section 20a, a side wall 34 that protrudes to the sheet member 31 side is integrally provided. First fitting concave portions 35 are provided at a plurality of spots of the side wall 34. First fitting protrusion portions 36 are fitted in the first fitting concave portions 35. The first fitting protrusion portions 36 are each formed into a substantially T-shape and protrusively provided at the sheet member 31.

Further, at portions corresponding to remaining two sides of the triangular shape, in the outer periphery of the base section 20a, a plurality of fitting pins 37 are protrusively provided with a space therebetween, and boss portions 39 having fitting concave portions 38 in which the fitting pins 37 are fitted are protrusively provided on the sheet member 31.

Figure 6:
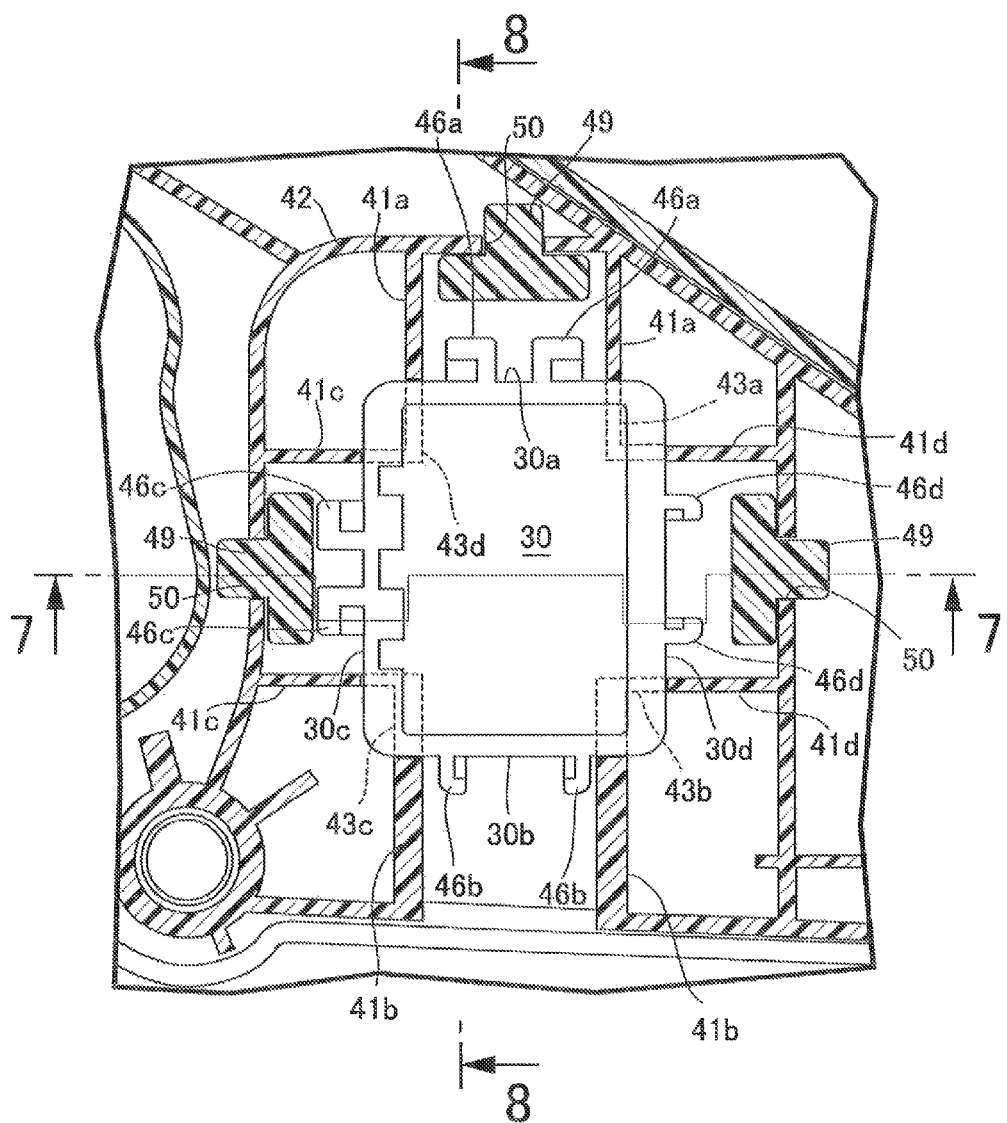
FIG. 6 is an enlarged sectional view taken along line 6-6 in FIG. 2.
Figure 7:
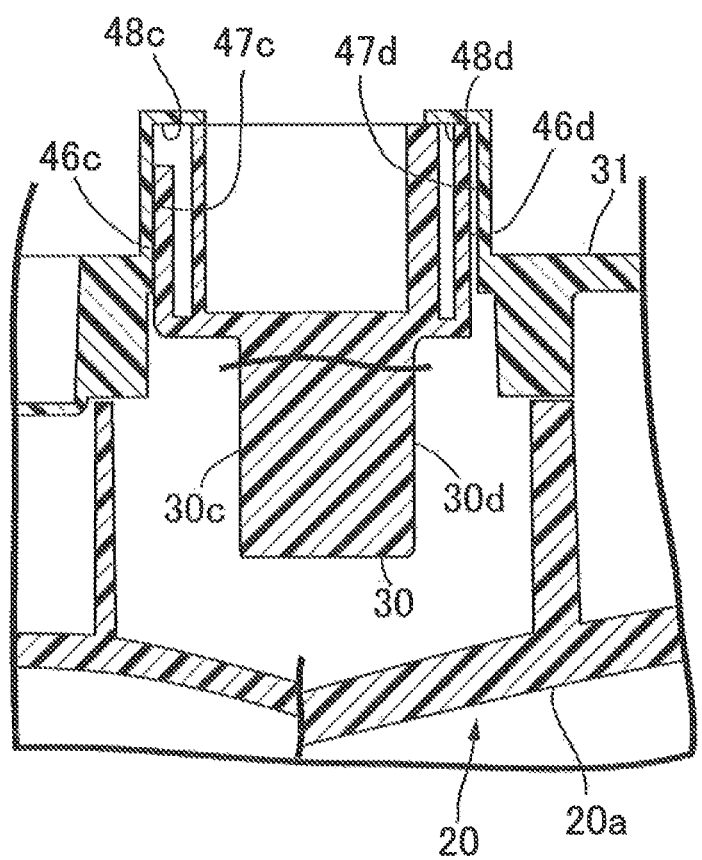
FIG. 7 is a sectional view taken along line 7-7 in FIG. 6.
Figure 8:
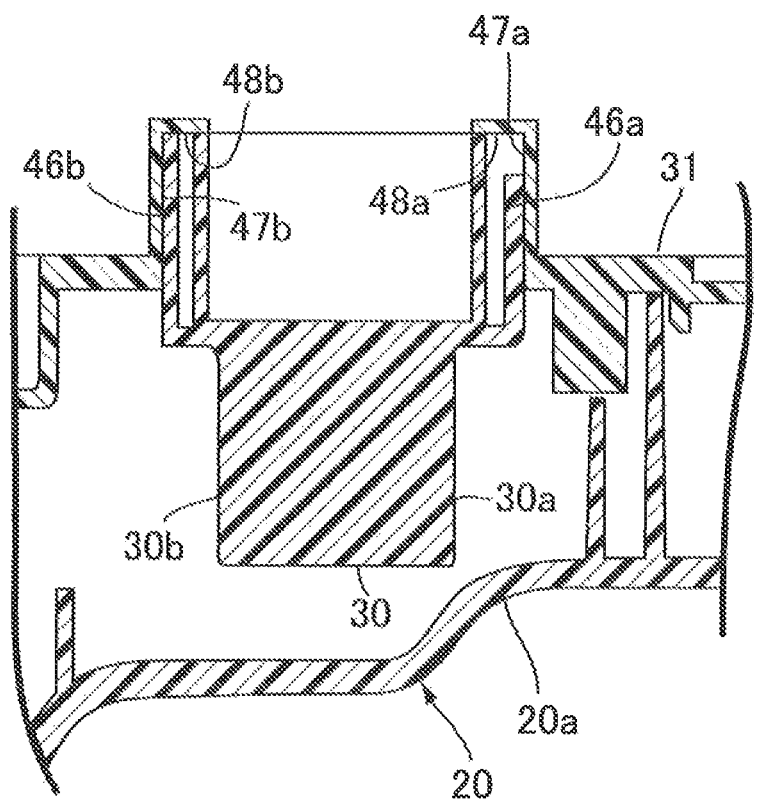
FIG. 8 is a sectional view taken along line 8-8 in FIG. 6.

Also referring to FIGS. 6 to 8, the coupler 30 has a substantially rectangular outer shape in which first and second side surfaces 30a, 30b that are parallel with each other, and third and fourth side surfaces 30c, 30d that are parallel with each other are made orthogonal to one another. Four pairs of abutment ribs 41a, 41b, 41c and 41d, in each pair of which the abutment ribs are parallel with each other, abut on the first to fourth side surfaces 30a to 30d, respectively, and are integrally provided on the base section 20a so as to be connected to the rib 32 via a connection rib 42. Abutment step portions 43a, 43b, 43c and 43d that abut on four corner portions of the coupler 30 from a side opposite from the sheet member 31 are formed on the base section 20a so as to be disposed among the respective pairs of the abutment ribs 41a, 41b, 41c and 41d.

Meanwhile, a rectangular holding hole 45 which holds a part of an opposite end side of the coupler 30 with the part inserted into the holding hole 45 is provided on the sheet member 31. In addition, four pairs of protruded portions 46a, 46b, 46c and 46d, in each pair of which the protruded portions are parallel with each other, protrude outward and are protrusively provided respectively on the respective side surfaces 30a to 30d of the coupler 30. Respective spaces between the protruded portions in the respective pairs of the protruded portions 46a, 46b, 46c, and 46d are set to be different from one another.

Further, on four inner surfaces of the holding hole 45, fitting grooves 47a, 47b, 47c and 47d are formed, and are opened to the base section 20a side so that the respective pairs of the protruded portions 46a, 46b, 46c and 46d are fitted in the fitting grooves 47a, 47b, 47c and 47d. End portions of the fitting grooves 47a to 47d on a side opposite from the base section 20a are closed with abutment step portions 48a, 48b, 48c and 48d that abut on the protruded portions 46a to 46d from the side opposite from the base section 20a. Namely, the coupler 30 is clamped between the abutment step portions 43a to 43d on the base member 20 side, and the abutment step portions 48a to 48d on the sheet member 31 side.

In addition, widths of the fitting grooves 47a to 47d are set to correspond to the spaces between the protruded portions 46a, 46b, 46c and 46d of the respective pairs, and the spaces between the protruded portions 46a, 46b, 46c and 46d of the respective pairs are different from one another, and therefore, an insertion posture of the coupler 30 into the holding hole 45 is constant.

Second fitting protrusion portions 49 each having a substantially T-shape are integrally and protrusively provided on the sheet member 31 so as to be disposed at, for example, three spots in a periphery of the holding hole 45. Second fitting concave portions 50 in which the second fitting protrusion portions 49 are fitted are provided at the connection rib 42 which connects the abutment ribs 41a, 41b, 41c and 41d with the rib 32.

Namely, by fitting of the first and second fitting protrusion portions 36, 49 to the first and second fitting concave portions 35, 50, and fitting of the fitting pins 37 to the fitting concave portions 38, the sheet member 31 is positioned to and held by the base member 20.

Further, cylindrical fastening boss portions 51 that protrude to the side door D side are integrally and protrusively provided at a plurality of spots, for example, three spots of the base section 20a. Meanwhile, on the sheet member 31, insertion holes 52 through which tip end portions of the fastening boss portions 51 are inserted respectively are provided. Bolts (not illustrated) that are inserted through the fastening boss portions 51 are fastened to the side door D, whereby the base member 20 and the sheet member 31 are fastened together to the side door D.

Next, an operation of the embodiment will be described. The sheet member 31, which is positioned to and held by the base member 20 and is sandwiched between the side door D and the base member 20, is fastened to the side door D by being fastened together with the base member 20, and the coupler 30 is clamped between the base member 20 and the sheet member 31. Therefore, exclusive members such as screw members and the like for attaching the coupler 30 are not required, and a fastening operation of the screw members is also not required. Accordingly, the coupler 30 can be attached using a fewer number of components and a fewer number of working steps.

Further, on the sheet member 31, the holding hole 45 which holds the part of the coupler 30 with the part inserted into the holding hole 45 is provided, and the plurality of second fitting protrusion portions 49 which are fitted in the second fitting concave portions 50 of the base member 20 are integrally and protrusively provided so as to be disposed in the periphery of the holding hole 45. Therefore, the coupler 30 can be firmly held between the sheet member 31 and the base member 20.

The embodiment of the present invention is described thus far, but the present invention is not limited to the above described embodiment, and various design changes can be made without departing from the scope of the claims.

What is claimed is:

1. A vehicle door mirror comprising:
a base member that is configured to be mounted to a side door;
a sheet member that is positioned next to, and held by the base member;
a mirror housing accommodating electric components, the mirror housing being rotatably supported at the base member; and
a coupler that is electrically connected to the electric components, the coupler being attached to the base member,
wherein the sheet member is sandwiched between the side door and the base member, and is fastened to the side door together with the base member, and
the coupler is clamped between the base member and the sheet member without requiring additional fasteners to hold the coupler in place.

2. The vehicle door mirror according to claim 1, wherein:
the sheet member has a holding hole formed therein, the holding hole being configured to hold a part of the coupler therein,
the sheet member has a plurality of fitting protrusion portions thereon, the fitting protrusion portions formed integrally and protrusively provided on the sheet member so as to be disposed in a periphery of the holding hole, and the fitting protrusion portions are fitted into corresponding structure provided on the base member.

3. The vehicle door mirror according to claim 1, wherein the coupler is configured to define a hollow space for connecting to an electrical harness.

4. The vehicle door mirror according to claim 2, wherein each of fitting protrusion portions has a substantial T-shape and engages with a concave space provided on the base member.

5. A vehicle door mirror, comprising:
a base member that is configured to be mounted to a side door;
a sheet member that is positioned next to, and held by the base member;
a mirror housing accommodating electric components therein, said mirror housing rotatably supported at the base member; and
a coupler that is electrically connected to the electric components, said coupler being attached to the base member,
wherein the sheet member is sandwiched between the side door and the base member, and is fastened to the side door together with the base member,
the coupler has a substantially rectangular outline shape, and
the coupler is clamped between the base member and the sheet member without requiring additional fasteners to hold the coupler in place.

6. The vehicle door mirror according to claim 5, wherein:
the sheet member has a holding hole formed therein, the holding hole being configured to hold a part of the coupler therein,
the sheet member having a plurality of fitting protrusion portions thereon, the fitting protrusion portions formed integrally and protrusively on the sheet member so as to be disposed in a periphery of the holding hole, and each fitting protrusion portions has a substantial T-shape and engages with a concave space provided on the base member.

7. The vehicle door mirror according to claim 6, wherein the holding hole has a substantially rectangular shape.

8. The vehicle door mirror according to claim 5, wherein:
protruded portions are protrusively provided and protrude outward on respective side surfaces of the coupler, and
the base member has first abutment step portions that abut on four corner portions of the coupler from a side thereof facing toward the sheet member.

9. The vehicle door mirror according to claim 8, wherein
on four inner surfaces of the holding hole, fitting grooves are formed and are opened to a side of base member so that the protruded portions of the coupler are fitted in the fitting grooves,
end portions of the fitting grooves on a side facing toward the base member are closed with second abutment step portions that are configured to abut on the protruded portions, and
the coupler is clamped between the first step abutment portions on the base member and the second abutment step portions on the sheet member.

* * * * *